United States Patent
Gingras

(10) Patent No.: US 7,252,347 B2
(45) Date of Patent: Aug. 7, 2007

(54) BELT OVER MID-ROLLERS

(75) Inventor: David Gingras, Orford (CA)

(73) Assignee: Camoplast Inc. (CA)

( * ) Notice: Subject to any disclaimer, the term of this patent is extended or adjusted under 35 U.S.C. 154(b) by 47 days.

(21) Appl. No.: 11/034,992

(22) Filed: Jan. 12, 2005

(65) Prior Publication Data

US 2005/0173982 A1 Aug. 11, 2005

(30) Foreign Application Priority Data

Jan. 13, 2004 (CA) ................................ 2455074

(51) Int. Cl.
*B62D 55/14* (2006.01)
(52) U.S. Cl. .................. 305/124; 301/129; 301/137; 301/33
(58) Field of Classification Search .......... 305/124, 305/129, 130, 137, 140, 142, 33, 60, 184, 305/128, 181
See application file for complete search history.

(56) References Cited

U.S. PATENT DOCUMENTS

| | | | | |
|---|---|---|---|---|
| 1,267,825 A | * | 5/1918 | Trigwell | 305/40 |
| 1,438,228 A | * | 12/1922 | Ertz | 305/140 |
| 2,541,177 A | * | 2/1951 | Slemmons | 305/33 |
| 6,062,327 A | * | 5/2000 | Ketting et al. | 180/9.52 |
| 6,086,169 A | | 7/2000 | Keehner | |
| 6,299,264 B1 | | 10/2001 | Kautsch et al. | |
| 6,536,851 B2 | | 3/2003 | Grob et al. | |
| 7,036,894 B1 | * | 5/2006 | Woodall et al. | 305/185 |
| 2003/0209372 A1 | | 11/2003 | Campbell et al. | |

FOREIGN PATENT DOCUMENTS

| | | |
|---|---|---|
| EP | 1 291 270 A2 | 3/2003 |
| WO | WO 93/11022 | 6/1993 |

* cited by examiner

*Primary Examiner*—Russell D. Stormer
(74) *Attorney, Agent, or Firm*—Akerman Senterfitt

(57) ABSTRACT

A wheel structure driven by an endless track belt tensioned around a drive wheel and an idler wheel thereof, comprising a plurality of supporting mid-roller wheels provided between the drive wheel and the idler wheel, a second endless belt being tensioned around this plurality of mid-rollers.

8 Claims, 1 Drawing Sheet

BELT OVER MID-ROLLERS

CROSS REFERENCE TO RELATED APPLICATIONS

This application claims priority on Canadian patent application no. 2,455,074, filed on Jan. 13, 2004

FIELD OF THE INVENTION

The present invention relates to tracks for an industrial, agricultural or a recreational vehicle. More specifically, the present invention is concerned with a wheel structure driven by a first endless track belt and comprising a second track belt over mid-rollers.

BACKGROUND OF THE INVENTION

The propulsion system found on heavy-duty vehicles as well as on tracked recreational vehicles such as snowmobiles for example comprises longitudinally spaced apart wheel structures driven by an endless, substantially inextensible belt having an inner surface and an outer surface. The inner surface is provided with a series of longitudinally spaced members for guiding the track relative to driving and tracking wheels forming part of the wheel structures. The outer surface of the belt is formed of a plurality of longitudinally spaced tread members that provide traction to the vehicle when travelling on various ground conditions.

The wheel structures typically comprise a driven wheel and an idler wheel, with a series of supporting mid-rollers.

The endless belt engages the necessary supporting wheels such as drive and idler wheels or rollers. A recurrent problem relates to the wear out of the mid-rollers.

Typically, the mid-rollers are made of steel and protected with a layer of rubber, which proves to have a chunking problem and an overall reduced lifetime as well as providing a limited protection efficiency against rocks penetration to the track. Another solution also contemplated is the use of steel scrapers to clean off any debris so as to prevent them to be ingested between the track inner surface and support surfaces of the wheels of the improved wheel structure.

U.S. Pat. No. 6,299,264 discloses a solution for protecting the mid-rollers of an endless track laying work machine by a heat shield positioned between guide blocks of the endless track and an inner shoulder of the mid-wheel.

There is still a need in the art for an improved wheel structures driven by an endless track belt.

SUMMARY OF THE INVENTION

In accordance with the present invention, there is provided a wheel structure for a heavy duty track propelled vehicle driven by a first belt tensioned around a drive wheel and an idler wheel, comprising a plurality of supporting mid-roller wheels between the drive wheel and the idler wheel; and a second track belt tensioned around the plurality of mid-rollers, the second track belt being driven by friction therewith.

Other objects, advantages and features of the present invention will become more apparent upon reading of the following non-restrictive description of embodiments thereof, given by way of example only with reference to the accompanying drawings.

DESCRIPTION OF EMBODIMENTS OF THE INVENTION

Figure 1:
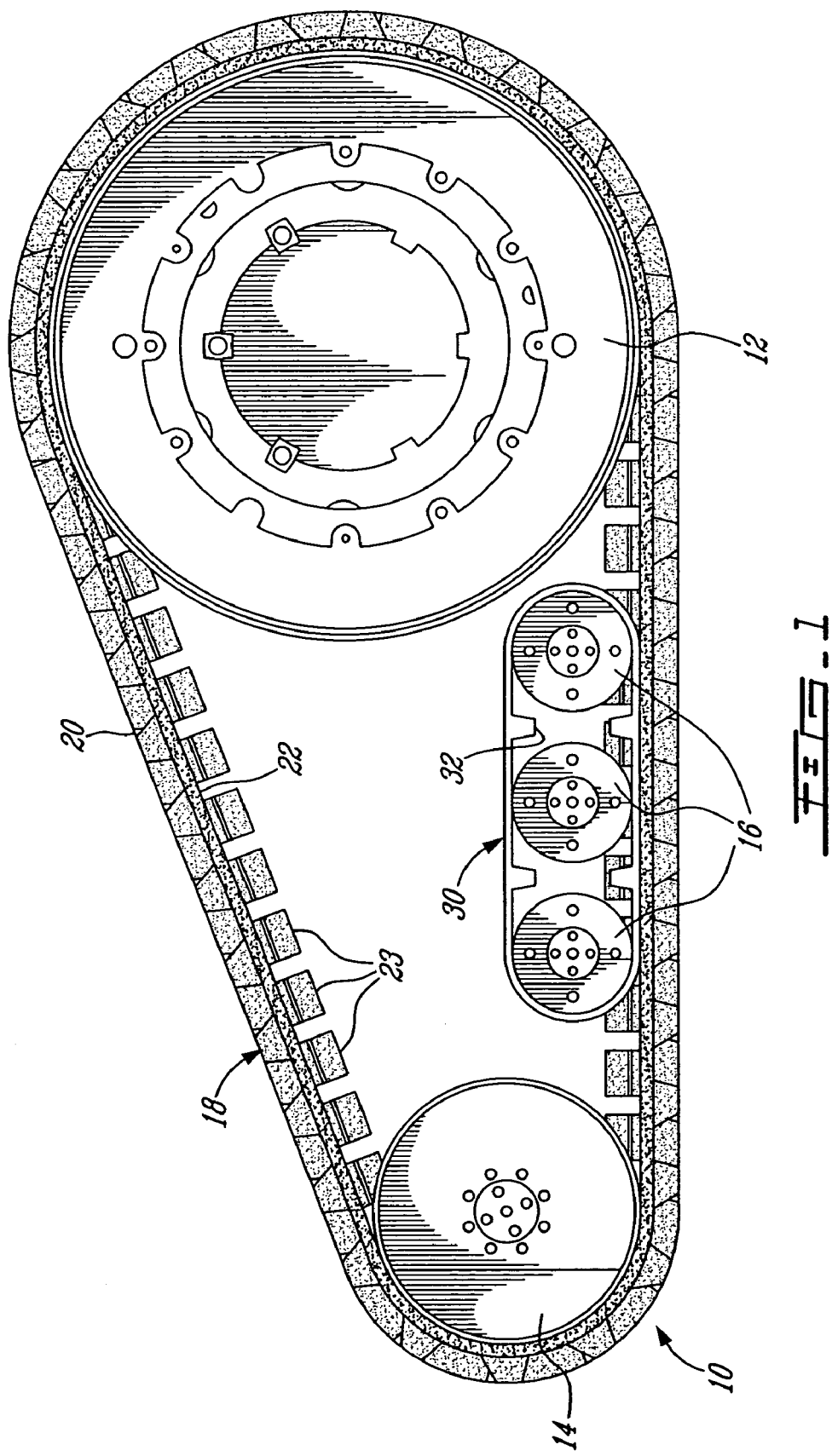
FIG. 1 is a side-view of a wheel structure according to an embodiment of the present invention.

Referring to FIG. 1, there is shown a wheel structure, generally denoted 10, which may be found on each opposite side of a chassis of a heavy duty track propelled vehicle for example (not shown). The structure usually includes a drive wheel 12 and an idler wheel 14 included within a loop defined by a track or belt 18. Traction of the vehicle is achieved by a high frictional engagement of the belt 18 with the drive wheel 12.

The belt 18 typically comprises an endless elongated body made of polymeric material having a ground contacting outer surface 20 and an inner surface 22. The core of the belt 18 may be reinforced as is conventionally known in the art.

The inner surface 22 comprises a series of longitudinally spaced guide lug members 23, which are adapted to provide guiding of the track 18 on undercarriage.

A plurality of supporting mid-roller wheels 16 is provided between the drive wheel 12 and the idler wheel 14, each mid-roller-wheel 16 comprising a solid rim.

A second track belt 30 is tensioned around the plurality of mid-rollers 16, and is driven by friction therewith. The second track belt 30 is guided by guide lugs 32 provided on an inner surface thereof, by engagement with the mid-rollers 16.

The second track belt 30 allows a long lasting contact with the guide lugs 23 of the inner surface 22 of the track 18, and allows a great reduction of wear of the track 18 and of the mid-rollers 16, due to an equal relative speed between the second track belt 30 and the guide lugs 23 of the track 18.

The second track belt 30 may be made of the same material than the belt 18. It is typically made of rubber and composite.

It is found that the second belt 30 provides a long lasting protection against flowable debris ingested between the track 18 inner surface 22 and support surfaces of the mid-rollers 16, which may have an abrasive action on the wheels of the drive structure, and therefore a damaging impact on the carcass life of the track 18. Consequently, the lifetimes of the mid-rollers 16 and of the track 18 as a whole are increased.

It is to be noted that the second track belt 30 may be easily replaced without removing the mid-rollers 16.

Although the present invention has been described hereinabove by way of embodiments thereof, it may be modified, without departing from the nature and teachings of the subject invention as described herein.

The invention claimed is:

1. A wheel structure for a track-propelled vehicle driven by a first belt, made of a polymer, tensioned around a drive wheel, an idler wheel and a plurality of supporting mid-roller wheels between the drive wheel and the idler wheel, wherein a second track belt is tensioned around said plurality of supporting mid-roller wheels, between an inner surface of the first belt and support surfaces of the supporting mid-rollers, in contact with said inner surface of the first belt, and is driven by friction, said second belt protecting the first belt and said supporting mid-roller wheels against wear by protecting said supporting mid-rollers against flowable debris ingested between the inner surface of the first belt and the support surfaces of the supporting mid-rollers.

2. The wheel structure according to claim 1, wherein said second track belt comprises guide lugs on an inner surface thereof.

3. The wheel structure according to claim 1, wherein said inner surface of the first belt comprises a series of longitudinally spaced guide lug members.

4. The wheel structure according to claim 1, wherein said first belt has a reinforced core.

5. The wheel structure according to claim 1, wherein said first belt comprises guide lugs on said inner surface thereof, a relative speed between said second track belt and the guide lugs of the first belt remaining constant.

6. The wheel structure according to claim 3, wherein a relative speed between said second track belt and the guide lug members of the first belt remaining constant.

7. The wheel structure according to claim 1, wherein the first belt and the second belt are made in a polymeric material.

8. The wheel structure according to claim 1, wherein the first belt and the second belt are made in one of rubber and composite.

* * * * *